United States Patent [19]

Larsen

[11] Patent Number: 5,204,125
[45] Date of Patent: Apr. 20, 1993

[54] MACHINE FOR FORMING A DOUGH PRODUCT

[75] Inventor: Hans K. Larsen, Aestorp, Sweden

[73] Assignee: Nestec S.A., Vevey, Switzerland

[21] Appl. No.: 702,247

[22] Filed: May 17, 1991

[30] Foreign Application Priority Data

Jun. 29, 1990 [EP] European Pat. Off. ........ 90112430.5

[51] Int. Cl.⁵ .............................................. A21C 11/10
[52] U.S. Cl. .................... 425/298; 425/394; 425/437; 426/496; 426/512
[58] Field of Search ............... 425/292, 298, 302.1, 425/305.1, 394, 398, 399, 401, 437; 426/496, 502, 504, 512

[56] References Cited

U.S. PATENT DOCUMENTS

| | | | |
|---|---|---|---|
| 4,303,677 | 12/1981 | De Acetis | 426/502 |
| 4,417,867 | 11/1983 | Bauer | 425/398 |
| 4,696,823 | 9/1987 | DeChristopher | 426/496 |
| 4,857,349 | 8/1989 | Finlay | 425/394 |

Primary Examiner—Jay H. Woo
Assistant Examiner—James P. Mackey
Attorney, Agent, or Firm—Vogt & O'Donnell

[57] ABSTRACT

A dough-based product is formed by a machine which has a reciprocable punch die and cutter fitted to the die positioned above an upper run of a conveyor, the die having a centrally disposed die surface which extends to a peripheral die surface channel positioned adjacent the cutter. The machine also has at least one set of a plurality of rollers, which are positioned beneath the conveyor upper run and arranged on a rotatable disc so that the at least one set forms a spiral configuration so that when the punch die reciprocates towards a dough product transported by the upper run, the dough product is pressed, formed and cut by the punch die and cutter, in cooperation with the rollers, into pieces having a thickened rim.

8 Claims, 2 Drawing Sheets

MACHINE FOR FORMING A DOUGH PRODUCT

BACKGROUND OF THE INVENTION

The present invention relates to automatic forming of dough-based products, more particularly to forming such products with a thick rim.

Normally, in the automatic production of pizza, the breads have the same thickness over the whole product. Baking of the pizza covered with a filling results either in the rim being overbaked and too hard, because the rim is not covered with the filling, or in a satisfactorily baked rim with an insufficiently baked middle area.

SUMMARY OF THE INVENTION

In addressing the problem noted above, the present invention provides a machine for the automatic forming of dough-based products comprising a conveyor having an upper run for transporting a dough above which is positioned a reciprocable punch die fitted with a cutter shaped to conform to the perimeter of the desired dough-based product. Positioned beneath the upper run is a rotatable disc provided on its upper surface with a plurality of rollers arranged to form at least one set of rollers having a spiral configuration, wherein the rollers of each set are adapted to press against the lower side of the upper run of the conveyor belt when the punch die descends.

DETAILED DESCRIPTION OF THE INVENTION

The machine of the present invention has a conveyor which is conveniently an endless belt fitted with drive means enabling intermittent or continuous motion.

The cutter fitted to the reciprocable punch die may be circular when the dough is desired to be cut into a dough-based product having a circular shape. Preferably, the circumference of the punch die is greater than the circumference of the rotating disc by an amount approximately equal to the desired width of the rim of the dough-based product. The lower edge of the punch die may advantageously be shaped so that there is an annular channel adjacent to and circumscribed by the die cutter roughly conforming to the desired configuration of the rim of the dough-based product.

The punch die may conveniently be driven by a pneumatic cylinder.

The punch die is advantageously provided with one or more vertical air channels through which compressed air may flow downwards as the punch die ascends in order to build up a pressure between the punch die and the pizza to assist the separation of the dough-based product from the bottom of the punch die.

The rotatable disc is, when in operation, preferably continuously rotating. The rotatable disc may be located permanently at a stationary position below the punch die, or both the rotatable disc and the reciprocable punch die may travel at the same speed and direction as the upper run of the belt in the same direction as the dough. In the former case, the conveyor belt transporting the dough travels intermittently and the punch die descends when the conveyor belt stops. In the latter case, the conveyor belt travels continuously.

The rollers may be small wheels or ball bearings, and generally, they are arranged in sets to form from two to six and preferably two to four distinct spiral configurations depending on the size of the rollers. The spirals conveniently extend substantially from the center towards the edge of the disc. The diameter of the rollers may vary from 0.5 to 8 cm and is conveniently from 1.5 to 3 cm.

The rotating disc is positioned so that the rollers may contact and press against the lower side of the conveyor belt when the punch die descends, so that the action of the at least one set of rollers on the rotating disc, because of the spiral configuration(s), sheets the dough from the middle area to build up a thicker rim.

The present invention also provides a method for the automatic forming of dough-based products comprising transporting a dough sheet on a conveyor belt to a position beneath a reciprocating punch die fitted with a cutter shaped to conform to the perimeter of the desired dough product and above a rotating disc provided on its upper surface with a plurality of rollers arranged to form at least one set of rollers having a spiral configuration whereupon, the punch die first descends to cut the dough and press it and the conveyor belt against the rollers to form a dough-based product with a thicker rim and then ascends.

The speed of rotation of the rotating disc may be from 50 to 200, preferably from 75 to 175 and especially from 100 to 150 RPM. The duration of the pressing generally varies inversely with the speed of rotation of the disc and may be from 0.5 to 10 seconds, more usually from 1 to 3 seconds.

After the cutting and sheeting, the dough may be transported by the conveyor, usually beneath a mandrel with cutting teeth for docking, then to a filling station for covering with a filling such as a sauce and finally to a baking oven.

The present invention is illustrated by way of example only with reference to the accompanying drawings.

DETAILED DESCRIPTION OF THE DRAWINGS

Figure 1:
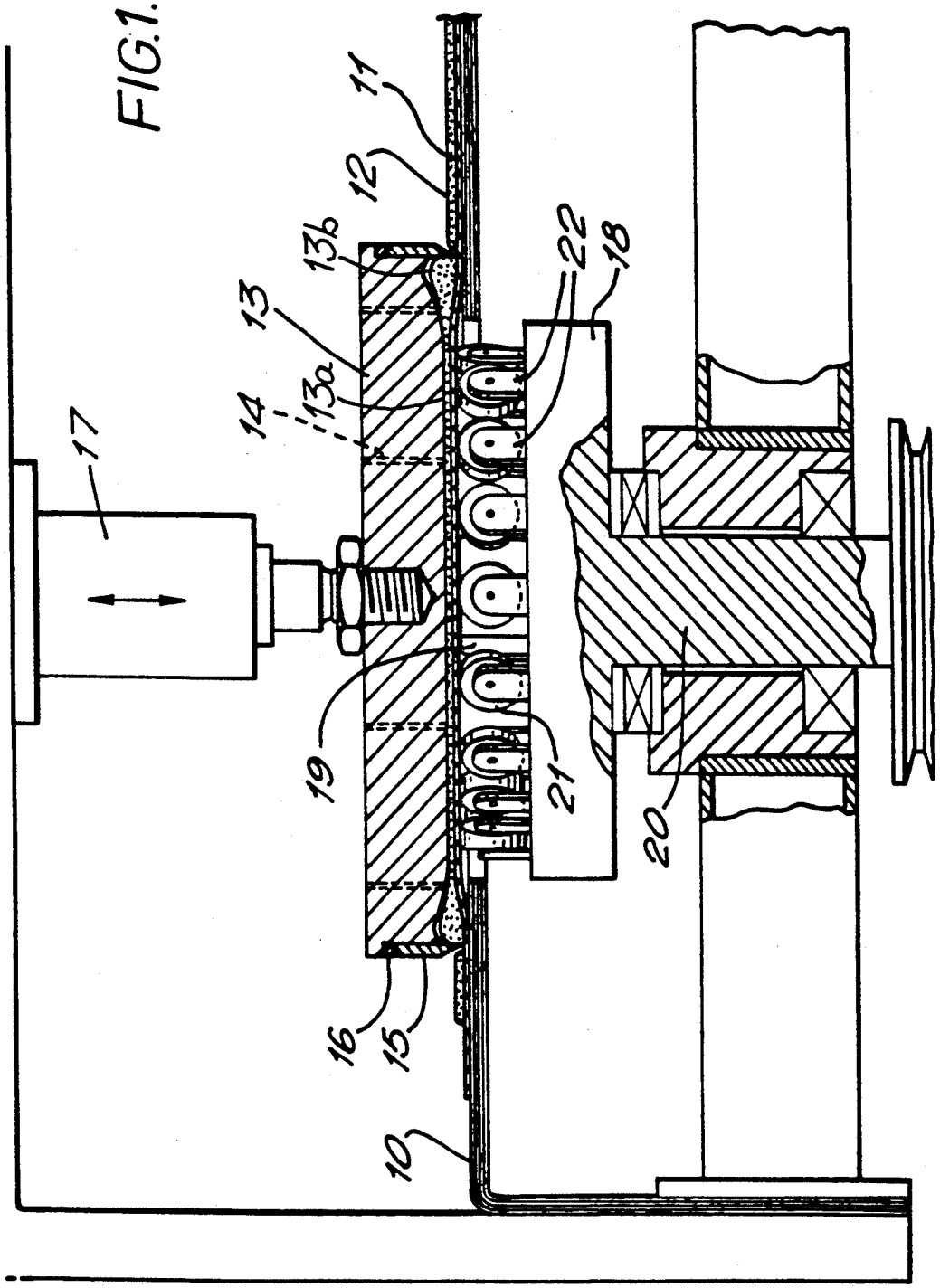
FIG. 1 represents a diagrammatic cross section of a machine of the present invention looking in the direction of the flow of the dough.

Referring to the drawings, the machine illustrated in FIG. 1 comprises a conveyor frame 10 and a conveyor belt 11, an upper run of which transports a pizza dough sheet 12 having a thickness of 4 mm. Positioned above conveyor belt upper run dough transport surface is a punch die 13 which has a centrally disposed die surface 13a which extends to a peripheral channel 13b positioned adjacent cutter 15 about the perimeter of the die. As illustrated, the die also is provided with channels 14 which extend through the die surface. The die is fitted to the cutter by damping ring 16. The die and cutter assembly is driven by a pneumatic cylinder 17.

Figure 3:
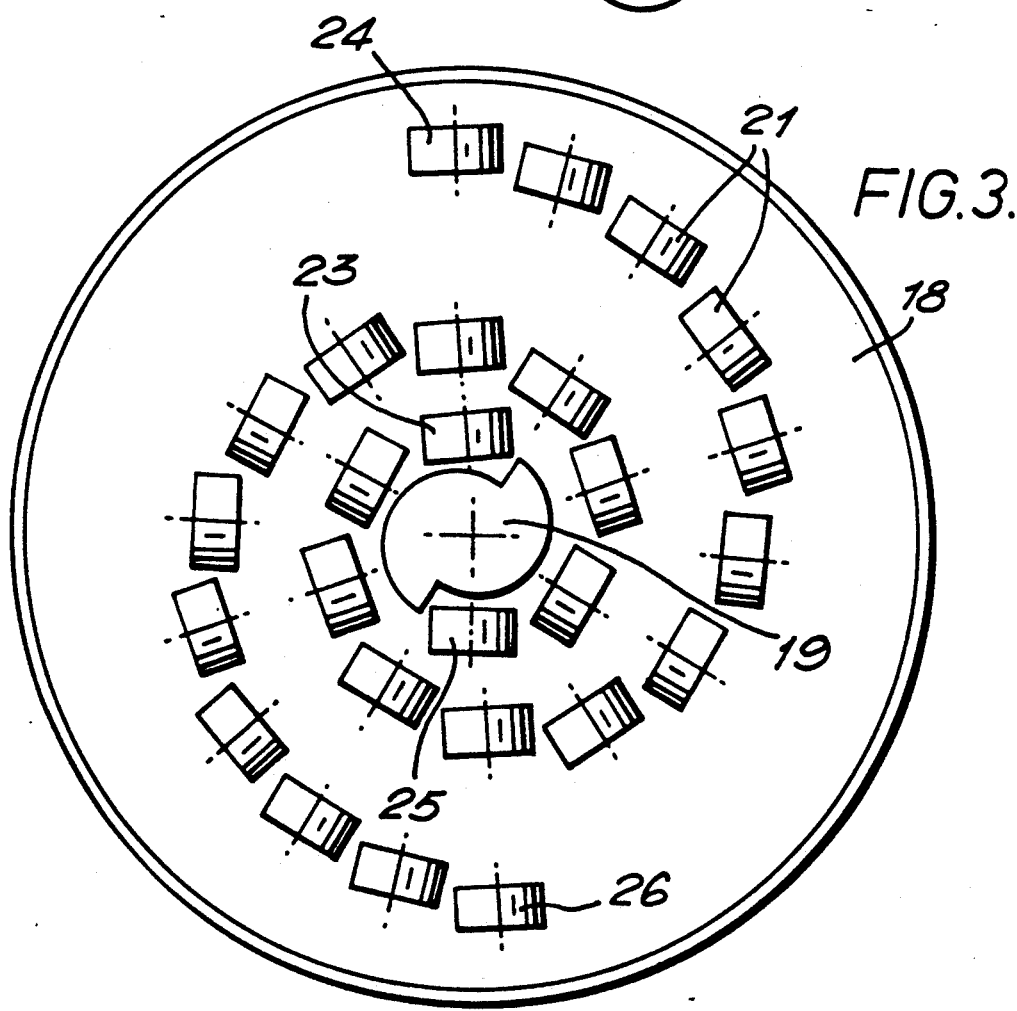
FIG. 3 represents a diagrammatic top plan view of a rotating disc of the machine of the present invention.

Positioned beneath the conveyor belt upper run transport surface is a disc 18 which is rotatable about a center point 19 on a shaft 20 and which is provided with rollers 21 having a diameter of 2.5 cms which are secured to the upper surface of the disc by means of supports 22. As illustrated in FIG. 3, the rollers are arranged in two sets, each comprised of a plurality of rollers, each set having a spiral configuration, wherein one set extends in a spiral configuration from roller 23 to roller 24 and wherein the other set extends in a spiral configuration from roller 25 to roller 26.

As also illustrated in FIG. 1, the perimeter of die and cutter assembly extends beyond a perimeter encompassed by rollers 21 which, as also illustrated, have a perimeter positioned within a perimeter defined by channel 13b. As is apparent and may be appreciated from FIG. 1, conveyor frame 10 contains an aperture therethrough so that a perimeter edge of the frame about the aperture is positioned about the perimeter of the rollers. As also illustrated, frame 10 extends within the perimeter defined by the die and cutter assembly.

Figure 2:
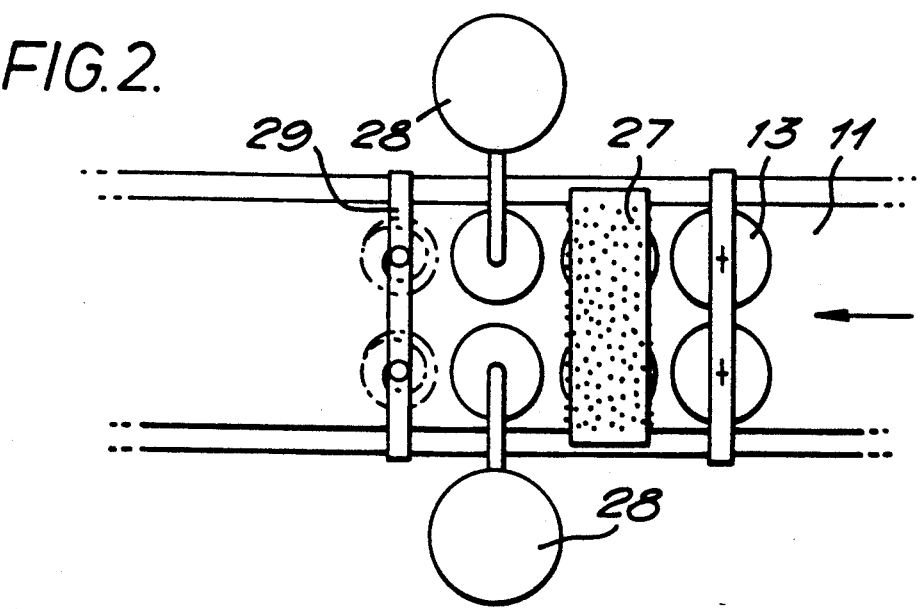
FIG. 2 represents a diagrammatic top plan view of a machine of the present invention.

Upstream of the punch die and positioned above the conveyor belt, as illustrated in FIG. 2, are a mandrel with cutting teeth 27, a sauce filling device 28 and a sauce distributor 29.

In operation, the upper run transport surface of conveyor belt 11 carrying the pizza dough sheet 12 travels intermittently. When the conveyor belt stops, the punch die 13 and the cutter 15 descend to cut and press the dough close to the belt and is pressed in cooperation with the rollers of the rotating disc 18, rotating at 100 RPM, for a period of 2 seconds, after which the punch die and cutter ascend and the conveyor restarts. The action of the die and cutter in cooperation with rollers 21, which are arranged on the rotating disc to form two sets of rollers having spiral configurations, as illustrated in FIG. 3, sheets the dough from the middle region to build up a rim in channel 13b which has a thickness greater than its centrally disposed portion, and the dough is cut into a distinct dough-based product piece. The damping ring 16 prevents the die cutter 15 from cutting the conveyor belt. As the punch die ascends, compressed air flows through the air channels 14 to build up a pressure between the bottom of the punch die and the pizza so that the punch die readily separates from the pizza.

The cut and pressed pizza bread dough now has a ground thickness of 3 mm and a rim of 8 mm thickness. The conveyor then transports the pizza bread beneath the mandrel (FIG. 2) with cutting teeth 27 (docking) and then beneath the sauce filling device 28 and a sauce distributor 29.

After baking, the filled pizza is baked evenly all over.

I claim:

1. A machine for forming a dough-based product comprising:

a conveyor positioned to have an upper run having a surface for transporting a dough product;

at least one set of rollers positioned beneath the upper run transport surface and arranged on a rotatable disc so that the at least one set of rollers forms a spiral configuration; and a reciprocable punch die and a cutter fitted to the die, wherein the die has a centrally disposed die surface portion which extends to a peripheral die surface channel portion which is positioned adjacent the cutter, the die and cutter being positioned for reciprocating to and from the upper run transport surface and the rollers so that when the die reciprocates towards a dough product transported on the transport surface, the dough product is pressed, formed and cut by the punch die and cutter, in cooperation with the rollers, into a piece having a rim having a thickness greater than a centrally disposed portion of the cut piece.

2. A machine according to claim 1 further comprising a damping ring for fitting the cutter to the die.

3. A machine according to claim 1 wherein the die further comprises at least one channel for building a pressure between the die and cut piece for separating the cut piece from the die.

4. A machine according to claim 1 wherein the at least one set of rollers extends substantially from a center to an edge of the rotatable disc.

5. A machine according to claim 1 wherein there are from two to four sets of rollers.

6. A machine according to claim 1 further comprising a frame which is positioned beneath the upper run for supporting the upper run and which has an aperture therethrough so that a perimeter edge of the frame about the aperture is positioned about a perimeter of the at least one set of rollers.

7. A machine according to claim 6 wherein the die and cutter have a perimeter which extends to a position beyond the perimeter of the at least one set of rollers and wherein the perimeter aperture edge of the frame extends to a position within the perimeter encompassed by the die and cutter.

8. A machine according to claim 6 wherein the peripheral die surface channel portion defines a perimeter which extends beyond the perimeter of the at least one set of rollers and wherein the perimeter aperture edge of the frame extends to be encompassed within the perimeter of the peripheral die surface channel portion.

* * * * *